US009485186B2

(12) United States Patent
Lai (10) Patent No.: US 9,485,186 B2
(45) Date of Patent: Nov. 1, 2016

(54) NETWORK CONGESTION CONTROL WITH AWARENESS OF RANDOM PACKET LOSSES

(71) Applicant: Cisco Technology, Inc., San Jose, CA (US)

(72) Inventor: Cheng-Jia Lai, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 13/948,279

(22) Filed: Jul. 23, 2013

(65) Prior Publication Data

US 2015/0029863 A1    Jan. 29, 2015

(51) Int. Cl.
| | |
|---|---|
| *H04L 12/807* | (2013.01) |
| *H04L 12/801* | (2013.01) |
| *H04L 29/06* | (2006.01) |
| *H04W 28/02* | (2009.01) |
| *H04L 12/825* | (2013.01) |
| *H04L 12/26* | (2006.01) |

(52) U.S. Cl.
CPC ........... *H04L 47/27* (2013.01); *H04L 43/0829* (2013.01); *H04L 47/12* (2013.01); *H04L 47/25* (2013.01); *H04L 69/163* (2013.01); *H04W 28/0236* (2013.01); *H04W 28/0284* (2013.01)

(58) Field of Classification Search
CPC ....... H04L 47/12; H04L 47/25; H04L 47/27; H04L 69/163; H04W 28/0236; H04W 28/0284
See application file for complete search history.

(56) References Cited

U.S. PATENT DOCUMENTS

| | | | | |
|---|---|---|---|---|
| 5,924,042 | A * | 7/1999 | Sakamoto et al. | 455/458 |
| 6,646,987 | B1 * | 11/2003 | Qaddoura | 370/231 |
| 6,680,976 | B1 * | 1/2004 | Chen et al. | 375/240.26 |
| 6,690,645 | B1 * | 2/2004 | Aweya et al. | 370/230 |
| 6,741,555 | B1 * | 5/2004 | Li et al. | 370/229 |
| 6,757,248 | B1 * | 6/2004 | Li et al. | 370/235 |
| 6,760,860 | B1 * | 7/2004 | Fong et al. | 714/4.5 |
| 7,035,214 | B1 * | 4/2006 | Seddigh et al. | 370/231 |
| 8,271,844 | B2 | 9/2012 | Terry et al. | |
| 8,681,601 | B1 * | 3/2014 | Dalvi | 370/216 |
| 2002/0034182 | A1 * | 3/2002 | Mallory | H04L 1/1635 370/394 |

(Continued)

FOREIGN PATENT DOCUMENTS

WO            0219654 A2        3/2002

OTHER PUBLICATIONS

Dong et al., "A Wireless Channel Model Based Rate Control (WMRC) Scheme in RTP/UDP for Real Time Multimedia Transmissions Over Wired-Wireless Networks (WMRC-RTP/UDP); draft-dong-wmrc-rtpcontrol-00.txt", Datagram Congestion Control, Dec. 24, 2010, 14 pages.

(Continued)

*Primary Examiner* — Dung B Huynh
(74) *Attorney, Agent, or Firm* — Edell, Shapiro & Finnan, LLC (57) ABSTRACT

Messages are sent from a first network device to a second network device across a network. The network includes a network portion with an expected random packet loss rate. The actual packet loss rate for packets sent across the network is compared to the expected random packet loss rate. A determination is made that the actual packet loss rate is greater than the expected random packet loss rate. Compensation for network congestion is performed in response to the determination that the actual packet loss rate exceeds the expected random packet loss rate.

20 Claims, 7 Drawing Sheets

(56) References Cited

U.S. PATENT DOCUMENTS

| | | | |
|---|---|---|---|
| 2002/0054570 A1* | 5/2002 | Takeda | 370/252 |
| 2002/0089994 A1* | 7/2002 | Leach, Jr. | H04L 1/08 370/412 |
| 2002/0150048 A1* | 10/2002 | Ha et al. | 370/231 |
| 2002/0174216 A1* | 11/2002 | Shorey et al. | 709/224 |
| 2003/0149785 A1* | 8/2003 | Gerla et al. | 709/232 |
| 2004/0044764 A1* | 3/2004 | Padmanabhan et al. | 709/224 |
| 2004/0205439 A1* | 10/2004 | Carmeli et al. | 714/748 |
| 2005/0054380 A1* | 3/2005 | Michaelis | 455/557 |
| 2005/0073954 A1* | 4/2005 | Bodin et al. | 370/232 |
| 2005/0144303 A1* | 6/2005 | Zhang et al. | 709/231 |
| 2005/0232151 A1* | 10/2005 | Chapweske et al. | 370/231 |
| 2006/0028991 A1* | 2/2006 | Tan et al. | 370/237 |
| 2006/0050633 A1* | 3/2006 | Lee et al. | 370/229 |
| 2006/0050640 A1* | 3/2006 | Jin et al. | 370/235 |
| 2006/0068769 A1* | 3/2006 | Adya et al. | 455/418 |
| 2006/0093295 A1* | 5/2006 | Ohtani et al. | 385/123 |
| 2007/0008899 A1* | 1/2007 | Shim et al. | 370/252 |
| 2007/0081454 A1* | 4/2007 | Bergamasco et al. | 370/229 |
| 2007/0223395 A1* | 9/2007 | Lee et al. | 370/252 |
| 2008/0008093 A1* | 1/2008 | Wang et al. | 370/235 |
| 2008/0144615 A1* | 6/2008 | Casey | H04L 29/125 370/389 |
| 2008/0225721 A1* | 9/2008 | Plamondon | 370/235 |
| 2009/0252127 A1* | 10/2009 | Rangarajan | H04W 16/10 370/338 |
| 2009/0259746 A1* | 10/2009 | Sasaki | 709/224 |
| 2009/0287968 A1* | 11/2009 | Lee et al. | 714/699 |
| 2010/0011270 A1* | 1/2010 | Yamamoto et al. | 714/748 |
| 2010/0039937 A1* | 2/2010 | Ramanujan et al. | 370/232 |
| 2010/0135165 A1* | 6/2010 | Parolari et al. | 370/252 |
| 2011/0225312 A1* | 9/2011 | Liu et al. | 709/231 |
| 2011/0225476 A1* | 9/2011 | Thottan et al. | 714/776 |
| 2011/0249553 A1* | 10/2011 | Wang et al. | 370/230 |
| 2011/0292897 A1* | 12/2011 | Wu et al. | 370/329 |
| 2012/0208580 A1* | 8/2012 | Luby | H04L 1/0009 455/509 |
| 2012/0236718 A1* | 9/2012 | Noureddin et al. | 370/235 |
| 2013/0114408 A1 | 5/2013 | Sastry et al. | |
| 2013/0114421 A1* | 5/2013 | Qian et al. | 370/252 |
| 2014/0334504 A1* | 11/2014 | Yie | H04H 20/18 370/474 |

OTHER PUBLICATIONS

Fu et al., "TCP Veno: TCP Enhancement for Transmission Over Wireless Access Networks", IEEE Journal on Selected Areas in Communications, vol. 21, No. 2, Feb. 2003, 14 pages.

International Search Report and Written Opinion in counterpart International Application No. PCT/US2014/036909, mailed Sep. 30, 2014, 11 pages.

* cited by examiner

NETWORK CONGESTION CONTROL WITH AWARENESS OF RANDOM PACKET LOSSES

TECHNICAL FIELD

The present disclosure relates to computer networks, and in particular, congestion compensation and avoidance in computer networks.

BACKGROUND

Congestion control mechanisms in Internet transport layers, such as Transmission Control Protocol (TCP) congestion control mechanisms and Stream Control Transmission Protocol (SCTP) congestion control mechanisms, have been designed to assume that packet losses are an indication of network congestion in the path. Additional mechanisms have been developed to provide congestion indications, e.g. explicit congestion notification (ECN), but these mechanisms are not consistently supported. Accordingly, transport layer congestion control mechanism implementations must still treat any packet loss as an indication of congestion.

Congestion control mechanisms adjust for congestion by resizing the congestion window (cwnd) size for the transmission. Even for layer-4 TCP and SCTP congestion signaling, such as ECN Congestion Experienced (CE) signaling, congestion control mechanisms react to the signaling in the same manner in which they react to actual lost packets.

As network technology evolves to include wireless networks, networks have begun to see random packet losses. For example, third generation (3G) wireless networks can see 1% packet loss rates even under perfect environmental conditions. Similarly, Long-Term Evolution (LTE) wireless users may see $10^{-4}$ or $10^{-6}$ percent packet loss rates even under the best of conditions. As wireless devices move around, they can experience significantly higher random packet loss rates due to the physical location of the device, and irrespective of current network congestion.

DESCRIPTION OF EXAMPLE EMBODIMENTS

Overview

Techniques are presented herein to provide congestion control with awareness of random packet losses. Messages are sent from a first network device to a second network device across a network. The network includes a network portion with an expected random packet loss rate. The actual packet loss rate for packets sent across the network is compared to the expected random packet loss rate. A determination is made that the actual packet loss rate is greater than the expected random packet loss rate. Compensation for network congestion is performed in response to the determination that the actual packet loss rate exceeds the expected random packet loss rate.

Example Embodiments

Figure 1:
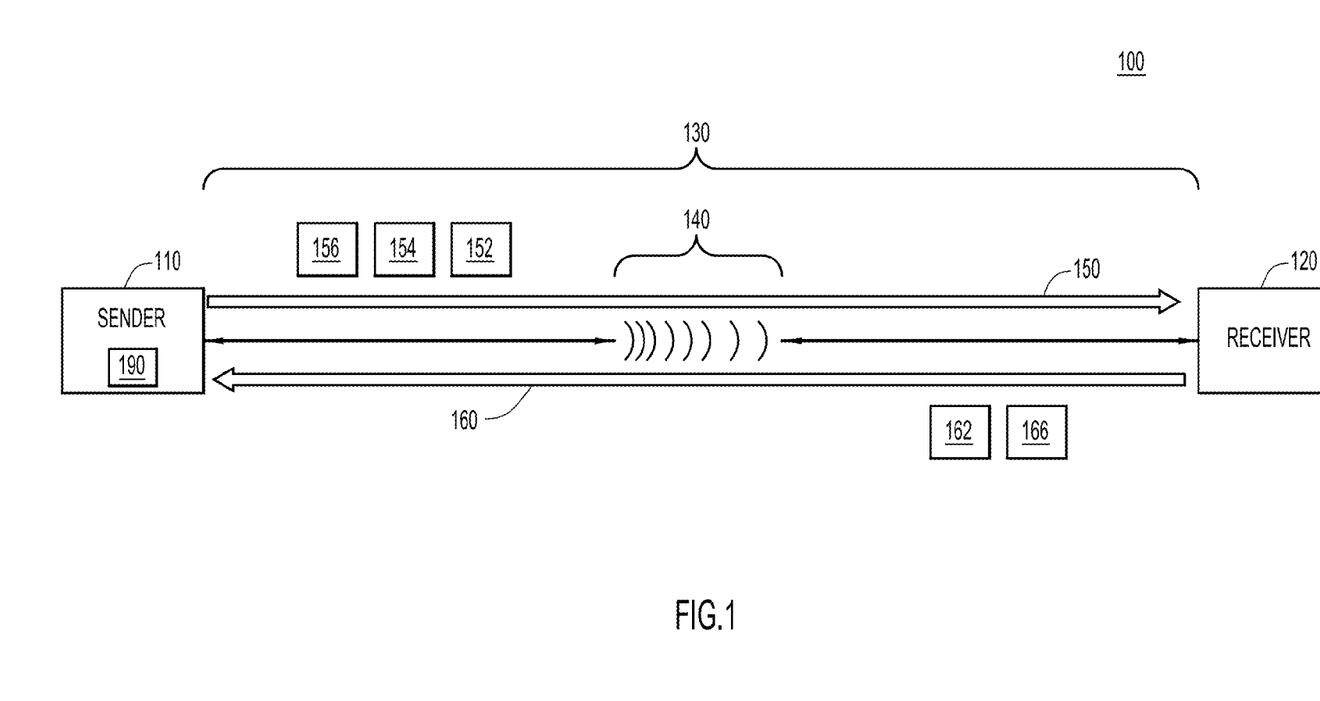
FIG. 1 is an illustration of an example network environment configured to employ congestion compensation with random packet loss awareness.

Depicted in FIG. 1 is network environment 100 in which network congestion compensation including random packet loss awareness may be been implemented. Included in network environment 100 is a sending device 110, a receiving device 120, and a network 130. Included within network 130 is portion 140 in which there is an expected random packet loss rate. According to the example of FIG. 1, portion 140 is embodied in an Open System Interconnection (OSI) model Layer 2 network portion, while the remainder of network 130 is embodied in OSI Layer 4 network portions. As a sending device, device 110 sends traffic 150 over network 130 to receiving device 120. The receiving device 120 responds to sending device 110 through return traffic 160, e.g., acknowledgments. Depending on the content of return traffic 160, sending device 110 may determine whether or not all of the packets sent through traffic 150 have been received by receiving device 120. Also included in sending device 110 is random packet loss awareness unit 190, which is configure to allow sending device 110 to apply congestion compensation to traffic 150 which takes into account the random packet loss rate of portion 140.

According to the example of FIG. 1, sending device 110 may send traffic 150 to receiving device 120 in the form of sequentially sent packets 152, 154 and 156. Packets 152, 154 and 156 may include sequence numbers indicative of the order in which they were sent. Accordingly, packet 152 may include a sequence number of "1," packet 154 may include a sequence number of "2" and packet 156 may include a sequence number of "3." These sequence numbers allow the packets 152, 154 and 156 to be reordered if they are received out of sequence. Receiving device 120 will acknowledge the packets it has received through acknowledgements 162 and 166, which will include the sequence number for the next packet it expects to receive. For example, acknowledgment 162 acknowledges receipt of packet 152, and includes the lowest sequence number that it has not yet received, mainly sequence number "2" for packet 154. Acknowledgement 166, which acknowledges receipt of packet 156, will also indicate the sequence number of "2" if packet 154 has not yet been received, as "2" would still be the lowest unreceived sequence number.

If sending device 110 receives a sequence number of "2" in a predetermined number of acknowledgement messages, such as messages 162 and 166, it may assume that packet 154 has been lost, and may proceed to resend packet 154. Sending device 110 may also modify the manner in which it sends packets when it is determined that a packet has been lost. For example, sending device may assume that network congestion is the cause of the packet loss rate, and sending device 110 may resize a congestion window to attempt to alleviate network congestion to improve the packet loss rate. On the other hand, if the packet loss rate is not due to network congestion, resizing the congestion window will not remedy the lost packet problem, and may further degrade network performance. In order to avoid this problem, sending device 110 is configured to include random packet loss awareness unit 190.

Random packet loss awareness unit 190 is configured to determine when a packet loss rate exceeds a random packet loss rate caused by a "lossy" portion of network 130. If the packet loss rate is below the random loss rate caused by the lossy portion of the network, random packet loss awareness unit 190 will determine that the packet loss is not due to network congestion, and therefore, packet transmission will not be modified to account for network congestion. On the other hand, if the packet loss rate exceeds the random packet loss rate, random packet loss awareness unit 190 may determine that network congestion is a contributing factor in the packet loss, and may direct sender 110 to take steps necessary to alleviate or compensate for the network congestion. Specifically, random packet loss awareness unit 190 will determine whether the following expression is true or not:

Actual Packet Loss Rate<Expected Random Packet Loss Rate

If the above-listed expression is true, the random packet loss awareness unit 190 may determine that at least some portion of the actual packet loss rate is due to network congestion. Accordingly, random packet loss awareness unit 190 can take appropriate action to alleviate the congestion. On the other hand, if the above-listed expression is not true, random packet loss awareness unit 190 may determine that the actual packet loss rate is not due to congestion.

For example, portion 140 of network 130 may be embodied in a wireless network portion, such as a Wi-Fi™ network, a third generation wireless network (e.g. 3G/GPRS/HPSA), or a fourth generation wireless network (e.g. 4G/LTE). These wireless networks are expected to see some packet loss regardless of the amount of traffic currently being handled by network 130. Specifically, wireless networks are subject to signal-to-noise ratio (SNR) optimization to save energy at wireless transceivers, and therefore, the transceivers will generally experience random packet loss. If portion 140 is embodied in a 3G wireless network, users may experience 1% packet loss regardless of network congestion. Similarly, if portion 140 is embodied in an LTE wireless network, users may experience a random packet loss rate of between $10^{-4}$ and $10^{-6}$ percent. Furthermore, mobile devices may experience greater random packet loss rates due to the physical location of the mobile device. Because these loss rates are not due to network congestion, the loss rate will not be improved by altering the rate or number of messages sent over network 130.

Furthermore, when congestion compensation techniques are applied in response to random packet losses, network performance may be degraded instead of improved. For example, even when the network path has no congestion, if congestion compensation techniques are applied in response to a 1% random packet loss rate, such as those present in 3G networks, the congestion window may be reduced to a value of less than 12.2 packets in equilibrium, and limit throughput over the network to less than 0.73 Mbps. If the random packet loss rate approaches or exceeds 10%, as may happen depending on the geographic location of a wireless device, the congestion window will drop to less than 3.87 packets in equilibrium, and throughput will drop to less than 0.23 Mbps. This drop in throughput due to the congestion compensation may result in significant under-utilization of wireless links. Furthermore, the drop in throughput may result in failures of certain applications, such as video streaming, even though the network should be able to provide sufficient throughput. For example, video streaming applications may experience oscillation of video quality or even complete failure over a network which is more than capable of supporting the video stream.

Accordingly, random packet loss awareness unit 190 would be aware of the expected random packet loss rate for network portion 140, and utilize this knowledge to control sending device 110 to compensate, or not compensate, for network congestion, as appropriate. Depending on the implementation, random packet loss awareness unit 190 may be made aware of the expected packet loss rate through different means. For example, random packet loss awareness unit 190 may be manually configured with the expected packet loss rate, the sending device 110 may include an application programming interface (API) which locally determines and reports the expected random packet loss rate to the random packet loss awareness unit 190, or the random packet loss awareness unit 190 may have the expected random packet loss rate reported to it through out-of-band signaling messages.

Figure 2:
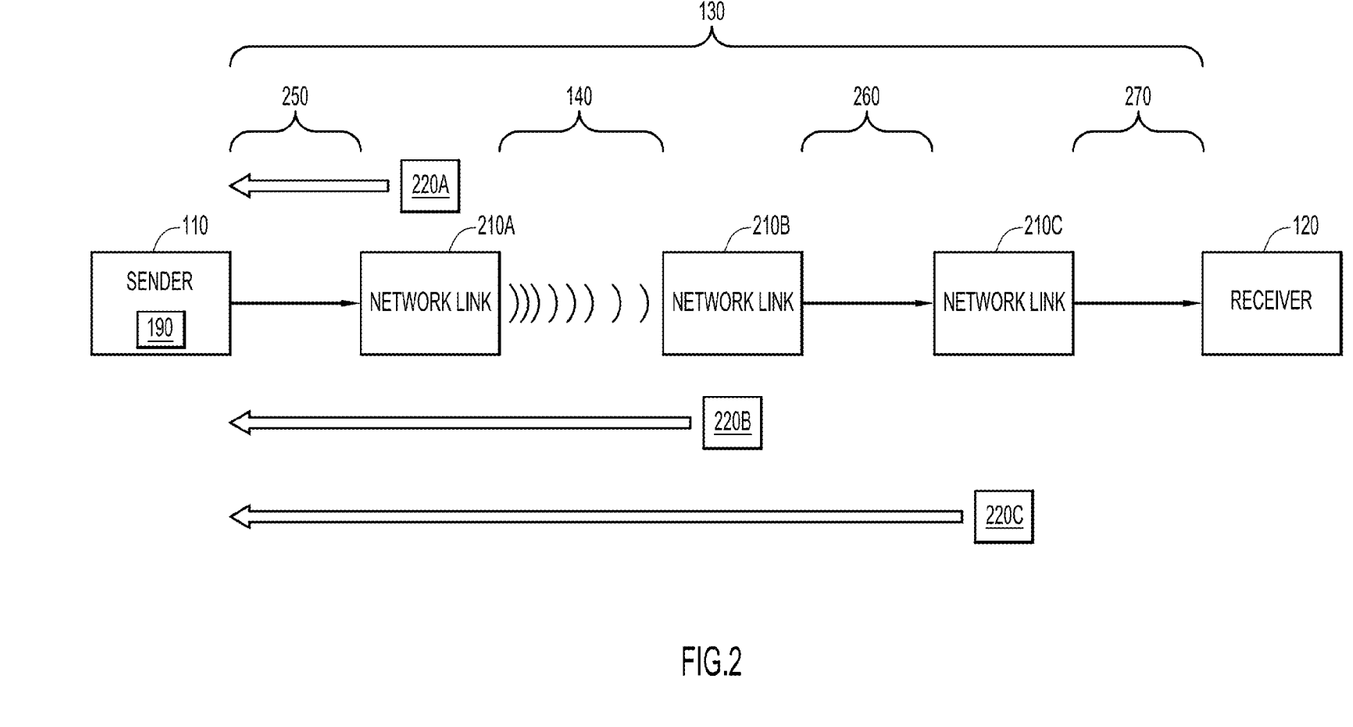
FIG. 2 is an illustration of an example network environment configured to provide random packet loss awareness through out-of-band signaling between a sending device and network links.

With reference now made to FIG. 2, depicted therein is an example sender device 110, including random packet loss awareness unit 190, which utilizes a combination of manual configuration and signaling. Specifically, the random packet loss awareness unit 190 may be manually configured with information indicating the type of lossy network portion 140 within network 130. Accordingly, the random packet loss awareness unit 190 will expect at least a minimum packet loss rate, such as the 1% packet loss rate of a 3G network. This manual configuration may be supplemented through an API that receives reports of dynamic packet loss rates from the local links 210a-c in network 130 for network portions 140 and 250-270. According to the example of FIG. 2, network links 210a-c use out-of-band signaling messages 220a-c to provide dynamic packet loss rates for individual portions 140 and 250-270 of network 130. For example, signaling message 220a may provide sender 110 with dynamic packet loss rate information for network portion 140. Similarly, message 220b provides dynamic packet loss rate information for portion 260, while message 220c provides dynamic packet loss rate information for portion 270.

Upon receipt of signaling messages 220a-c, random packet loss awareness unit 190 may determine the actual packet loss rate, as well as the expected random packet loss rate. By comparing the two values, random packet loss awareness unit 190 is able to appropriately compensate for packet losses over network 130.

Figure 3:
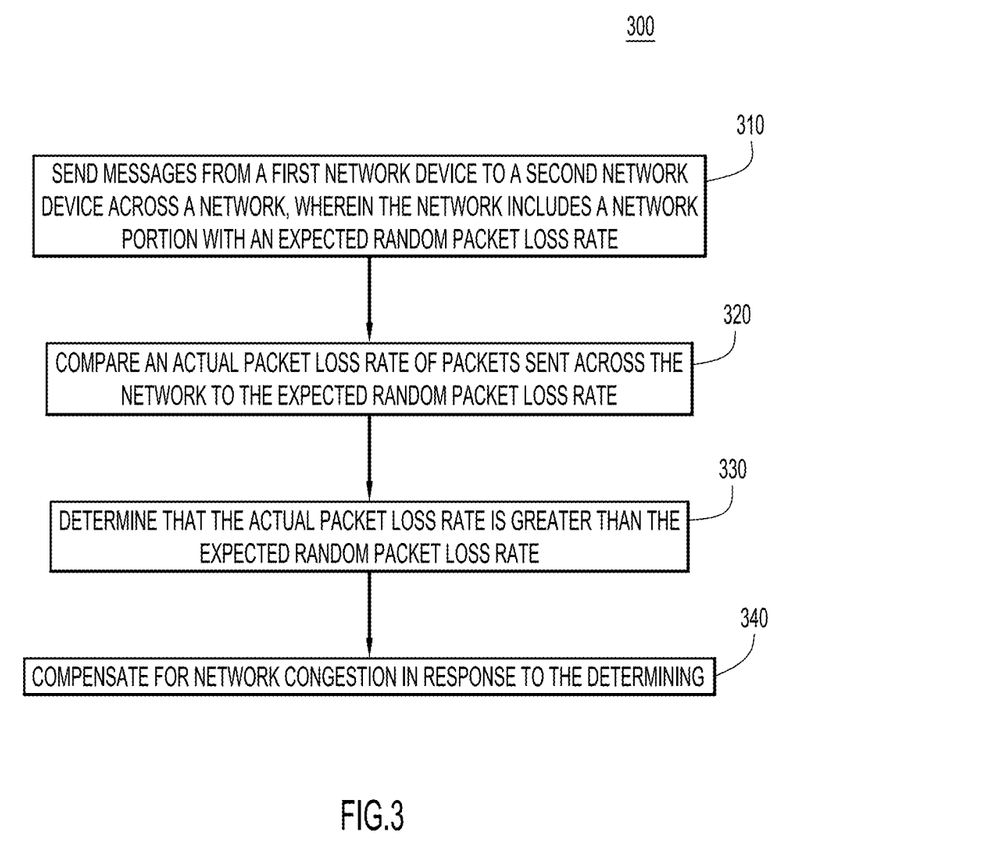
FIG. 3 is a flowchart illustrating a process for providing congestion compensation with random packet loss awareness.

Referring now to FIG. 3, depicted therein is a flowchart 300 depicting a process of providing congestion control with awareness of random packet losses. The process begins in block 310 in which messages are sent from a first network device to a second network device across a network. The network includes a network portion which includes an expected random packet loss rate. For example, the network may include a wireless portion which has an expected random packet loss rate due to SNR optimization.

In block 320, the actual packet loss rate is compared to the expected random packet loss rate. The expected random packet loss rate may be predetermined based on the type of network link in which the network portion having the expected random packet loss rate is embodied. In other examples, the expected random packet loss rate may be dynamically calculated by the sending device or through signaling messages sent to the sending device from one or more network links. The actual packet loss rate may be determined according to the content of acknowledgment messages received by the sending device, or in response to retransmission timeouts (RTOs), as will be described below with reference to FIGS. 4 and 5.

In block 330, a determination is made as to whether or not the actual packet loss rate exceeds the expected random packet loss rate. Specifically, it is determined that the actual packet loss rate is greater than the expected random packet loss rate. In block 340, network congestion is compensated for in response to the determination.

Figure 4:
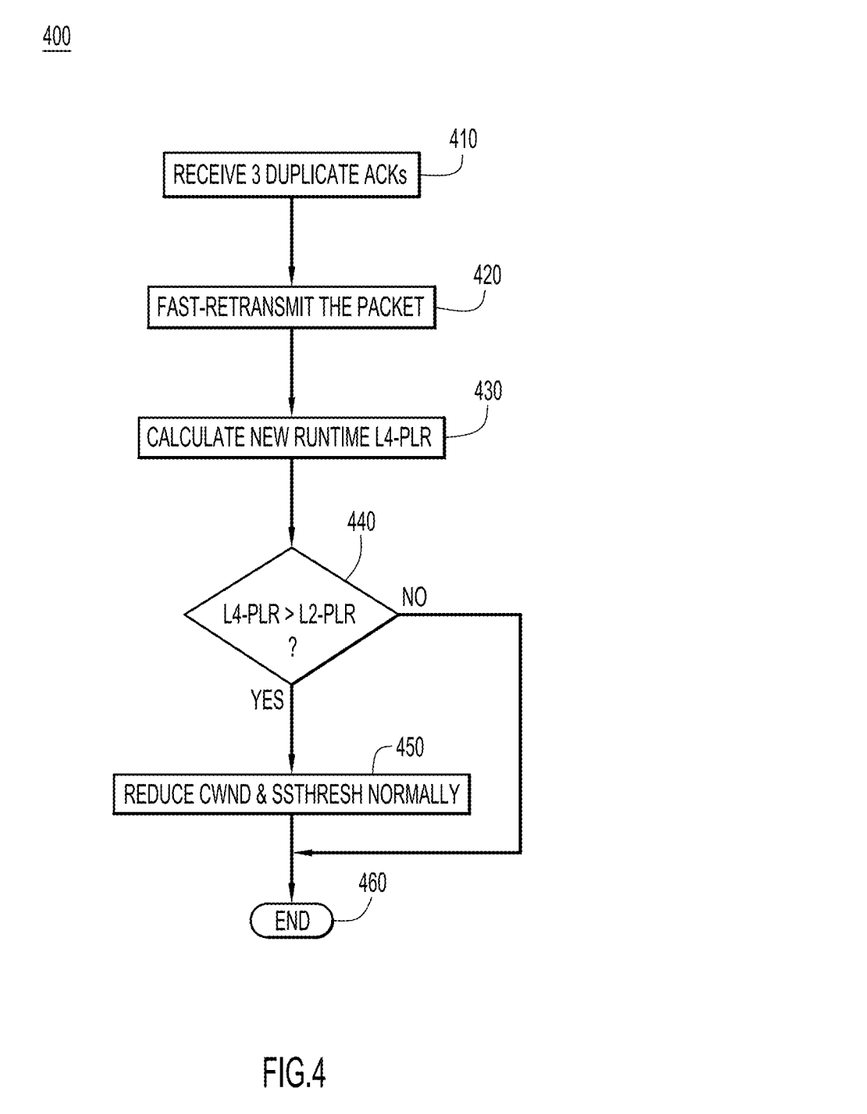
FIG. 4 is a flowchart illustrating congestion compensation with random packet loss awareness implemented in a network environment which fast retransmits lost packets in response to a predetermined number of duplicate acknowledgement messages.

With reference now made to FIG. 4, depicted therein is a flowchart 400 illustrating a process of providing congestion control with awareness of random packet losses in a Layer 4 network which includes a Layer 2 portion having an expected random packet loss rate. Furthermore, the Layer 4 network is configured to retransmit packets in response to receiving a predetermined number of duplicate acknowledgement messages.

The process begins in block 410 where a predetermined number of duplicate acknowledgement messages are received, in this case, three duplicate acknowledgement messages. As previously discussed above with reference to FIG. 1, the duplicate acknowledgement messages may serve as an indication that packets are being lost between the sending and receiving devices. According to the example of FIG. 4, if three acknowledgement messages are received which all indicate the same packet as the next expected packet, it may be determined that the indicated packet has been lost.

In block 420, the packet indicated by the duplicate acknowledgment messages is retransmitted to the receiving device. This retransmission is considered a "fast" retransmission because the sending device does not wait for a retransmission timer to time-out before retransmitting the packet. Instead, the packet is retransmitted as soon as the three duplicate acknowledgment messages are received. Because the three duplicate acknowledgement messages will often be received prior to expiration of the transmission timer, the retransmission in response to the duplicate acknowledgement messages is considered "fast" relative to other retransmission techniques.

Next, if the sending device was not operating with awareness of expected random packet loss rates in its congestion compensation methods, the sending device may immediately compensate for network congestion. According to the present example, the actual packet loss rate is first calculated in step 430. Specifically, the Layer 4 packet loss rate (L4-PLR) is calculated. According to the example of FIG. 4, Layer 4 packet loss rate is calculated in response to the fast retransmission of block 420. According to other examples, the Layer 4 packet loss rate may be calculated in response to fast retransmitting a predetermined number of packets, or the Layer 4 packet loss rate may be calculated at predetermined intervals.

In step 440, the Layer 4 packet loss rate is compared to the expected random packet loss rate, which according to the example of FIG. 4 is the Layer 2 packet loss rate (L2-PLR). Specifically, it is determined whether or not the Layer 4 packet loss rate is greater than the Layer 2 packet loss rate. If the Layer 4 packet loss rate is less than or equal to the Layer 2 packet loss rate, it may be determined that the Layer 4 packet loss rate is simply due to the random losses in the Layer 2 portion of the network, and therefore, performing congestion compensation would be ineffective. Accordingly, the process would continue to block 460, where the process ends until duplicate acknowledgment messages indicate that another packet has been lost.

On the other hand, if the Layer 4 packet loss rate is greater than the Layer 2 packet loss rate, it may be determined that network congestion contributes, at least partially, to the Layer 4 packet loss rate. Accordingly, the process proceeds to block 450 where a congestion window (cwnd) and the slow start threshold (ssthresh) are reduced according to a slow-start congestion compensation method. Specifically, slow-start congestion compensation avoids sending more data than a network is capable of handling by decreasing the number of packets that can be sent without receiving an acknowledgement (decreasing the congestion window) and decreasing the threshold for when more congestion compensation or avoidance should be performed (decreasing the slow start threshold). Upon completion of the congestion compensation or avoidance of block 450, the process ends in block 460, and the sending device continues sending packets until another packet is lost.

Figure 5:
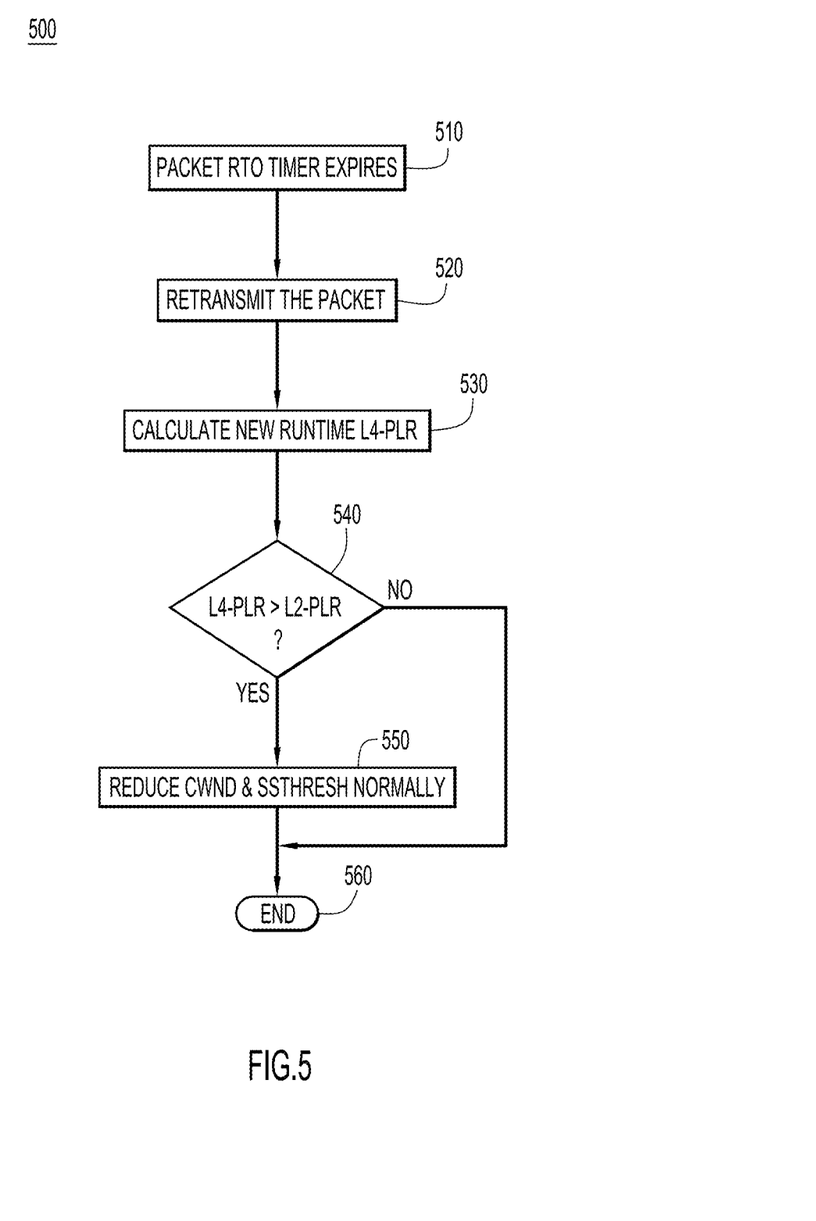
FIG. 5 is a flowchart illustrating congestion compensation with random packet loss awareness implemented in a network environment which retransmits lost packets in response to expiration of a retransmission timer.

With reference now made to FIG. 5, depicted therein is flowchart 500 illustrating a process similar to that illustrated in flowchart 400 of FIG. 4. The process of flowchart 500 differs from that of FIG. 4 in that the sending device waits for retransmission timeouts (RTOs) before determining a packet has been lost. Accordingly, the process begins in block 510 where a packet RTO timer expires. In response to expiration of the timer, the sending device retransmits the packet. Next, if the sending device was not operating with awareness of expected random packet loss rates in its congestion compensation methods, the sending device may immediately compensate for network congestion. Instead, because the sending device does implement or operate with awareness of expected random packet loss rates, the runtime Layer 4 packet loss rate is calculated in step 530. In step 540, it is determined whether or not the Layer 4 packet loss rate exceeds the expected random packet loss rate, in this case, the Layer 2 packet loss rate. If the Layer 4 packet loss rate is less than or equal to the expected random Layer 2 packet loss rate, the process ends at step 560 without any congestion compensation or avoidance being performed.

If, on the other hand, the Layer 4 packet loss rate exceeds the expected Layer 2 packet loss rate, network congestion compensation and/or avoidance is performed in step 550. Specifically, because the Layer 4 packet loss rate exceeds the expected Layer 2 packet loss rate, it may be determined that network congestion contributes, at least partially, to the Layer 4 packet loss rate. In response, the sending device will reduce the congestion window and slow start threshold in order to compensate for the network congestion. Once the congestion window and slow start threshold are reduced, the process completes in block 560 until another lost packet is detected.

Figure 6:
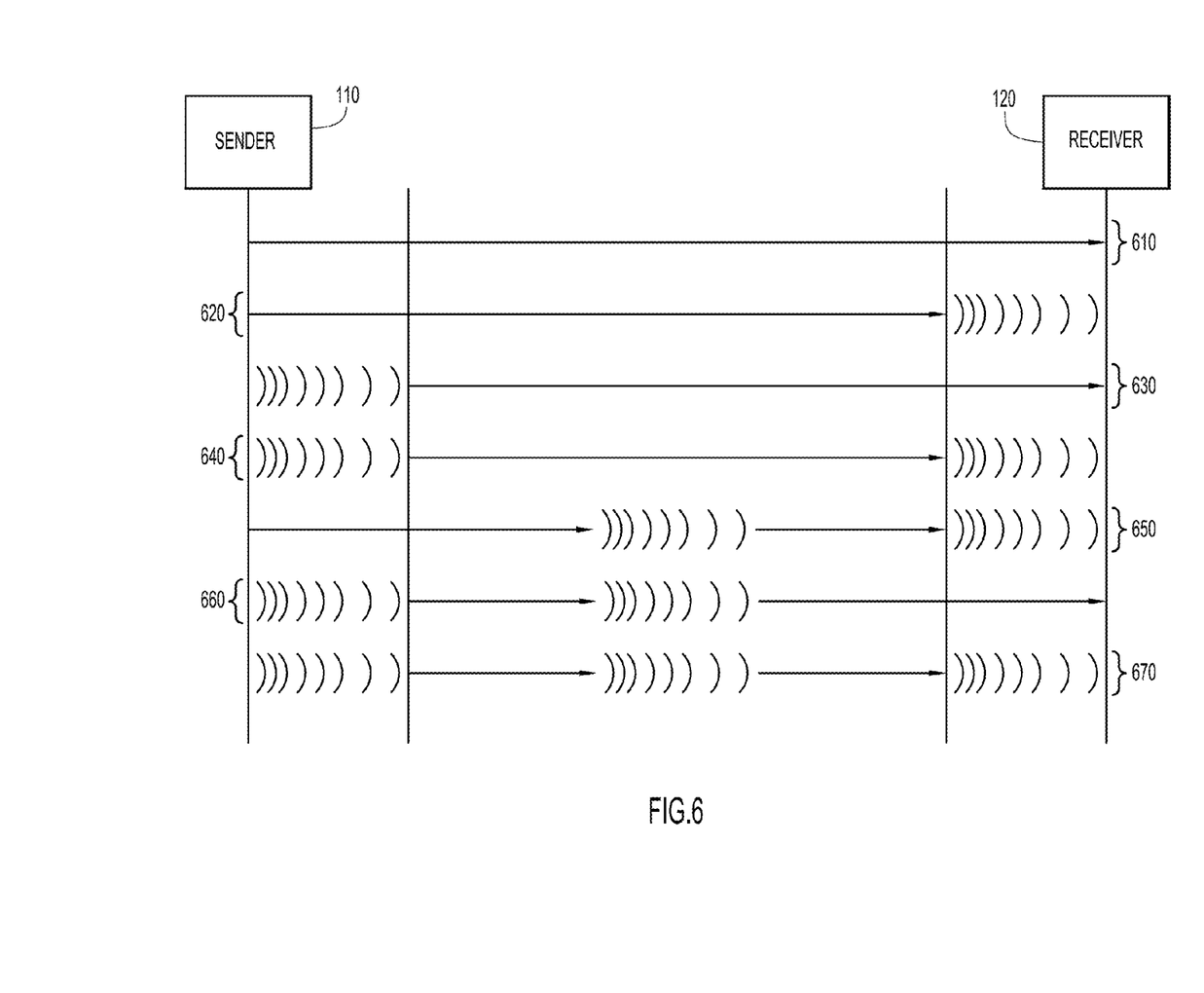
FIG. 6 is an illustration of a plurality of network configurations that may implement congestion compensation with random packet loss awareness.

With reference now made to FIG. 6, depicted therein is a plurality of example networks 610-670 over which packets are sent from sending device 110 to receiving device 120. As illustrated, the entirety of network 610 between sending device 110 and receiving device 120 may be comprised of wired or optical networks, without any intervening wireless network portions. Nevertheless, so long as some or all of network 610 has an expected random packet loss rate, the techniques described herein will apply. For networks 620 and 630, the wireless or lossy portion of the network does not need to be located at an intermediate network link. Instead, the wireless or lossy portion of the network may be local to either of sending device 110 or receiving device 120. Finally, as illustrated, networks 640-670 are not limited to a single wireless or lossy portion. Instead, each of networks 640-670 is constructed from two or more wireless or lossy portions.

Figure 7:
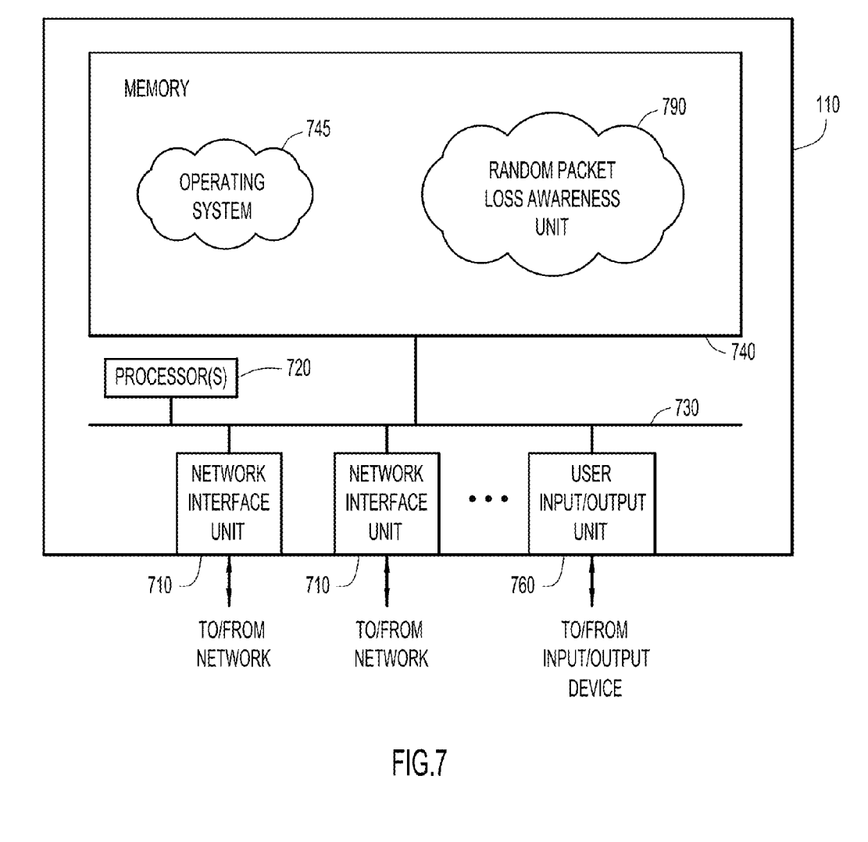
FIG. 7 is a block diagram of a network enabled device configured to provide congestion compensation with random packet loss awareness.

Turning to FIG. 7, depicted therein is a network enabled device configured to implement network congestion compensation including random packet loss awareness, such as sending device 110. The sending device 110 comprises one or more network interface units 710 (e.g., network interface cards) to enable communication over a network, processor(s) 720, bus 730, and memory 740. The memory 740 contains software instructions for operating system 745 and random packet loss awareness unit 790.

Memory 740 may comprise ROM, RAM, magnetic disk storage media devices, optical storage media devices, flash memory devices, electrical, optical, or other physical/tangible (e.g., non-transitory) memory storage devices. The processor 720 is, for example, a microprocessor or microcontroller that executes instructions, including instructions contained random packet loss awareness unit 790. Thus, in general, the memory 740 may comprise one or more tangible (non-transitory) computer readable storage media (e.g., a memory device) encoded with software comprising computer executable instructions and when the software is executed (by the processor 720), and in particular random packet loss awareness unit 790, it is operable to perform the operations described herein in connection with FIGS. 1-5. Specifically, random packet loss awareness unit 790 includes instructions that allow processor 720 to implement congestion compensation including expected random packet loss awareness.

By implementing the techniques and devices described above, networks may achieve improved Transmission Control Protocol/Stream Control Transmission Protocol (TCP/SCTP) throughput and network utilization for better user experiences, particularly when the Layer 4 end-to-end path includes a wireless link or other portion which experiences random packet losses, particularly in Layer 2 of the OSI model. Furthermore the techniques and devices described herein may be applied as an enhancement to any existing TCP and SCTP congestion control mechanism (or other Layer 4 protocols). Specifically, these techniques may be particularly advantageous in Layer 4 networks supporting Selective Acknowledge (SACK), (e.g. TCP-SACK and SCTP) which allows for more accurate runtime estimation of the Layer 4 packet loss rate. Furthermore, the when signaling is implemented to dynamically determine Layer 2 random packet loss, the Layer 2 packet loss rate can be advantageously collected instead of relying solely on acknowledgement messages generated at the last hop of the transmission path.

The above description is intended by way of example only.

What is claimed is:

1. A method comprising:
   sending messages from a first network device to a second network device across a network, wherein the network includes a network portion with a random packet loss rate;
   receiving out-of-band signaling messages from network elements along a path through the network between the first network device and the second network device, wherein the path comprises the network portion with the random packet loss rate;
   determining, from the out-of-band signaling messages, a Layer 4 packet loss rate of packets sent across the network and a Layer 2 random packet loss rate for the network portion with the random packet loss rate;
   comparing the Layer 4 packet loss rate of packets sent across the network to the Layer 2 random packet loss rate;
   determining that the Layer 4 packet loss rate is greater than the Layer 2 expected random packet loss rate; and
   compensating for network congestion in response to the determining.

2. The method of claim 1, wherein compensating for network congestion comprises reducing a congestion window of the first network device.

3. The method of claim 1, wherein compensating for network congestion comprises reducing a slow-start threshold of the first network device.

4. The method of claim 1, further comprising fast retransmitting a lost packet from the first network device to the second network device.

5. The method of claim 1, further comprising receiving at the first device a message reporting the Layer 2 random packet loss rate of the network portion.

6. The method of claim 5, wherein receiving the message comprising receiving a locally generated message.

7. The method of claim 1, further comprising dynamically calculating the Layer 4 packet loss rate from the out-of-band signaling messages.

8. The method of claim 1, further comprising receiving a plurality of duplicate acknowledgement messages;
   wherein comparing the Layer 4 packet loss rate to the Layer 2 random packet loss rate comprises comparing in response to receiving the plurality of duplicate acknowledgment messages.

9. The method of claim 1, wherein comparing the Layer 4 packet loss rate to the Layer 2 random packet loss rate comprises comparing the Layer 4 packet loss rate to the Layer 2 random packet loss rate in response to expiration of a retransmission time-out timer.

10. The method of claim 1, wherein sending the messages from the first network device to the second network device comprises sending the messages across a wireless portion of the network.

11. The method of claim 1, wherein receiving the out-of-band signaling message comprises receiving a plurality of messages from devices associated with a corresponding one of a plurality of network links, wherein each of the plurality of messages indicates a Layer 2 random packet loss rate for a respective network link.

12. A method comprising:
    sending messages from a first network device to a second network device across a network, wherein the network includes a network portion with an expected random packet loss rate;
    receiving at the first device a message reporting the expected random packet loss rate of the network portion;
    comparing an actual packet loss rate of packets sent across the network to the expected random packet loss rate;
    determining that the actual packet loss rate is greater than the expected random packet loss rate; and
    compensating for network congestion in response to the determining,
    wherein receiving the message comprises receiving an out-of-band signaling message; and
    wherein receiving the out-of-band signaling message comprises receiving a plurality of messages from devices associated with a corresponding one of a plurality of network links, wherein each of the plurality of messages indicates an expected random packet loss rate for a respective network link.

13. The method of claim 12, wherein compensating for network congestion comprises reducing a congestion window of the first network device.

14. The method of claim 12, wherein compensating for network congestion comprises reducing a slow-start threshold of the first network device.

15. An apparatus comprising:
- a network interface unit configured to enable network communications;
- a memory; and
- a processor coupled to the network interface unit and the memory, wherein the processor is configured to:
  - send messages to a receiving network device across a network, wherein the network includes a network portion with an expected random packet loss rate;
  - receive out-of-band signaling messages from network elements along a path through the network between the apparatus and the receiving network device, wherein the path comprises the network portion with the expected random packet loss rate;
  - determine, from the out-of-band signaling messages, a Layer 4 packet loss rate of packets sent across the network and a Layer 2 random packet loss rate for the portion with the expected random packet loss rate;
  - compare the Layer 4 packet loss rate of packets sent across the network to the Layer 2 random packet loss rate;
  - determine that the Layer 4 packet loss rate is greater than the Layer 2 random packet loss rate; and
  - compensate for network congestion in response to determining that the Layer 4 packet loss rate is greater than the Layer 2 random packet loss rate.

16. The apparatus of claim 15, wherein the processor is further configured to receive a message reporting the Layer 2 random packet loss rate of the network portion.

17. The apparatus of claim 15, wherein the processor is configured to receive the out-of-band signaling message by receiving a plurality of messages from devices associated with a corresponding one of a plurality of network links, wherein each of the plurality of messages indicates a Layer 2 random packet loss rate for a respective network link.

18. A tangible computer readable medium comprising instructions that when executed by a processor cause the processor to:
- send messages to a receiving network device across a network, wherein the network includes a network portion with an expected random packet loss rate;
- receive out-of-band signaling messages from network elements along a path through the network between the processor and the receiving network device, wherein the path comprises the network portion with the expected random packet loss rate;
- determine, from the out-of-band signaling messages, a Layer 4 packet loss rate of packets sent across the network and a Layer 2 random packet loss rate for the portion with the expected random packet loss rate;
- compare the Layer 4 packet loss rate of packets sent across the network to the Layer 2 random packet loss rate;
- determine that the Layer 4 packet loss rate is greater than the Layer 2 random packet loss rate; and
- compensate for network congestion in response to determining that the Layer 4 packet loss rate is greater than the Layer 2 random packet loss rate.

19. The computer readable medium of claim 18, wherein the instructions further cause the processor to receive a message reporting the Layer 2 random packet loss rate of the network portion.

20. The computer readable medium of claim 18, wherein the instructions operable to receive the out-of-band signaling message are operable to receive a plurality of messages from devices associated with a corresponding one of a plurality of network links, wherein each of the plurality of messages indicates a Layer 2 random packet loss rate for a respective network link.

* * * * *